United States Patent
Sun et al.

(10) Patent No.: US 10,977,578 B2
(45) Date of Patent: Apr. 13, 2021

(54) CONVERSATION PROCESSING METHOD AND APPARATUS BASED ON ARTIFICIAL INTELLIGENCE, DEVICE AND COMPUTER-READABLE STORAGE MEDIUM

(71) Applicant: BEIJING BAIDU NETCOM SCIENCE AND TECHNOLOGY CO., LTD., Haidian District Beijing (CN)

(72) Inventors: Ke Sun, Beijing (CN); Shiqi Zhao, Beijing (CN); Dianhai Yu, Beijing (CN); Haifeng Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 47 days.

(21) Appl. No.: 16/006,213

(22) Filed: Jun. 12, 2018

(65) Prior Publication Data

US 2018/0357571 A1 Dec. 13, 2018

(30) Foreign Application Priority Data

Jun. 13, 2017 (CN) .......................... 201710444160.9

(51) Int. Cl.
*G06N 20/00* (2019.01)
*G06F 7/14* (2006.01)
(Continued)

(52) U.S. Cl.
CPC ............... *G06N 20/00* (2019.01); *G06F 7/14* (2013.01); *G06N 3/006* (2013.01); *G06N 5/04* (2013.01); *G06F 40/30* (2020.01)

(58) Field of Classification Search
CPC ...... G06N 20/00; G06N 3/08; G06F 17/2785; G06F 17/277; G06F 16/338;
(Continued)

(56) References Cited

U.S. PATENT DOCUMENTS

| 2005/0159949 | A1* | 7/2005 | Yu | .......................... | G10L 15/065 |
| | | | | | 704/235 |
| 2006/0206332 | A1 | 9/2006 | Paek et al. | | |

(Continued)

FOREIGN PATENT DOCUMENTS

| CN | 105027197 A | 11/2015 |
| CN | 105068661 A | 11/2015 |

(Continued)

OTHER PUBLICATIONS

Chinese Office Action dated Apr. 3, 2020, for related Chinese Appln. No. 201710444160.9; 6 Pages.

(Continued)

*Primary Examiner* — Richemond Dorvil
*Assistant Examiner* — Rodrigo A Chavez
(74) *Attorney, Agent, or Firm* — Brooks Kushman PC

(57) ABSTRACT

A conversation processing method and apparatus based on artificial intelligence, a device and a computer-readable storage medium. The disclosure embodiments, enable the user feedback information provided by conversation service conducted by the user to model conversation understanding system, then according to the user feedback information, perform adjustment processing for a service state of the model conversation understanding system, to obtain an adjustment state of the model conversation understanding system so that it is possible to execute the conversation service with the model conversation understanding system, based on the adjustment state. Since a fault-tolerant and fault-correcting mechanism is provided, it is possible to (Continued)

adjust the understanding capability of the model conversation understanding system in real time and thereby effectively improve the reliability of conversation by collecting the user's user feedback information, and then adjusting the service state of the model conversation understanding system in time based on the user feedback information.

15 Claims, 3 Drawing Sheets

(51) Int. Cl.
  *G06N 5/04* (2006.01)
  *G06F 40/30* (2020.01)
  *G06N 3/00* (2006.01)
(58) Field of Classification Search
  CPC .... G06F 16/9535; G06F 17/18; G06F 16/285; G06F 16/3329; G06F 16/355; G06F 17/2775; G06F 17/2705; G06F 17/271; G06F 17/2715; G06F 17/2725; G06F 17/278; G06F 11/079; G06F 16/24; G06F 16/90332; G06F 16/9038; G06F 17/27; G06F 17/2881; G10L 15/14; G10L 15/22; G10L 15/063; G10L 15/16; G10L 15/1815; G10L 15/26; G10L 2015/223; G10L 15/18; G10L 15/265; G10L 25/30; G10L 25/48; G10L 25/63
  USPC .................................. 704/9, 10, 270, 275
  See application file for complete search history.

(56) References Cited

U.S. PATENT DOCUMENTS

| | | | |
|---|---|---|---|
| 2010/0049517 A1* | 2/2010 | Huang | H04M 3/4936 704/251 |
| 2011/0166862 A1* | 7/2011 | Eshed | G10L 15/30 704/270 |
| 2012/0310961 A1* | 12/2012 | Callison | G06F 16/2379 707/756 |
| 2016/0342683 A1* | 11/2016 | Lim | G06F 16/35 |
| 2016/0351206 A1 | 12/2016 | Gelfenbeyn et al. | |
| 2017/0192778 A1* | 7/2017 | Srivastava | G06F 8/20 |
| 2018/0174020 A1* | 6/2018 | Wu | G06N 3/08 |
| 2018/0196796 A1* | 7/2018 | Wu | G06F 16/9024 |
| 2018/0203851 A1* | 7/2018 | Wu | G06N 3/006 |
| 2018/0213062 A1* | 7/2018 | Muthyala | G06F 16/3344 |
| 2018/0218080 A1* | 8/2018 | Krishnamurthy | G06N 3/006 |
| 2018/0342004 A1* | 11/2018 | Yom-Tov | G06N 7/08 |

FOREIGN PATENT DOCUMENTS

| | | |
|---|---|---|
| CN | 105845137 A | 8/2016 |
| CN | 106796787 A | 5/2017 |

OTHER PUBLICATIONS

Chinese Search Report dated Mar. 26, 2020 for related Chinese Appln. No. 201710444160.9; 3 Pages.

* cited by examiner

CONVERSATION PROCESSING METHOD AND APPARATUS BASED ON ARTIFICIAL INTELLIGENCE, DEVICE AND COMPUTER-READABLE STORAGE MEDIUM

The present application claims the priority of Chinese Patent Application No. 201710444160.9, filed on Jun. 13, 2017, with the title of "Conversation processing method and apparatus based on artificial intelligence, device and computer-readable storage medium". The disclosure of the above applications is incorporated herein by reference in its entirety.

FIELD OF THE DISCLOSURE

The present disclosure relates to human-machine conversation technologies, and particularly to a conversation processing method and apparatus based on artificial intelligence, a device and a computer-readable storage medium.

BACKGROUND OF THE DISCLOSURE

Artificial intelligence AI is a new technical science for researching and developing theories, methods, technologies and application systems for simulating, extending and expanding human intelligence. Artificial intelligence is a branch of computer sciences and attempts to learn about the essence of intelligence, and produces a type of new intelligent machines capable of responding in a manner similar to human intelligence. The studies in the field comprise robots, language recognition, image recognition, natural language processing, expert systems and the like.

In recent years, the concept "conversation as platform" increasingly wins support among the people. Many Internet products and industries begin to attempt to introduce a conversation-type human-machine interaction manner (also called a conversation robot) into products, for example, household electrical appliance, finance, and medical care. Correspondingly, demands for developing conversation robots also become stronger and stronger.

Therefore, it is desirable to provide a reliable conversation processing method, to ensure reliability of the conversation.

SUMMARY OF THE DISCLOSURE

A plurality of aspects of the present disclosure provide a conversation processing method and apparatus based on artificial intelligence, a device and a computer-readable storage medium, to ensure reliability of the conversation.

According to an aspect of the present disclosure, there is provided a conversation processing method based on artificial intelligence, comprising:

obtaining user feedback information provided by conversation service conducted by a user and a model conversation understanding system;

according to the user feedback information, performing adjustment processing for a service state of the model conversation understanding system, to obtain an adjustment state of the model conversation understanding system;

using the model conversation understanding system to execute the conversation service based on the adjustment state of the model conversation understanding system.

The above aspect and any possible implementation mode further provide an implementation mode: the user feedback information comprises at least one of the following information:

positive information;
negative information;
error-correcting information;
clarifying information; and
defining information.

The above aspect and any possible implementation mode further provide an implementation mode: the user feedback information comprises active feedback information and passive feedback information.

The above aspect and any possible implementation mode further provide an implementation mode: before obtaining user feedback information provided by conversation service conducted by a user and a model conversation understanding system, the method further comprises:

obtaining training feedback information provided by conversation service conducted by a user and a basic conversation understanding system;

according to the training feedback information, performing adjustment processing for a service state of the basic conversation understanding system, to obtain an adjustment state of the basic conversation understanding system;

performing data merging processing according to the training feedback information and the adjustment state of the basic conversation understanding system, to obtain model training data for building the model conversation understanding system.

The above aspect and any possible implementation mode further provide an implementation mode: before obtaining training feedback information provided by conversation service conducted by a user and a basic conversation understanding system, the method further comprises:

obtaining application scenario information of a conversation service scenario provided by a developer, the application scenario information including intent information, parameter information and corresponding execution actions;

according to the application scenario information, building the basic conversation understanding system having basic service logic.

The above aspect and any possible implementation mode further provide an implementation mode: after obtaining training feedback information provided by conversation service conducted by a user and a basic conversation understanding system, the method further comprises:

obtaining evaluation data of the basic conversation understanding system according to the training feedback information;

obtaining a satisfaction degree index of the basic conversation understanding system according to the evaluation data.

The above aspect and any possible implementation mode further provide an implementation mode: after the step of, according to the user feedback information, performing adjustment processing for a service state of the model conversation understanding system, to obtain an adjustment state of the model conversation understanding system, the method further comprises:

performing data merging processing according to the user feedback information and the adjustment state of the model conversation understanding system, to obtain updated training data for updating the model conversation understanding system.

According to another aspect of the present disclosure, there is provided a conversation processing apparatus based on artificial intelligence, comprising:

an obtaining unit configured to obtain user feedback information provided by conversation service conducted by a user and a model conversation understanding system;

an adjusting unit configured to, according to the user feedback information, perform adjustment processing for a service state of the model conversation understanding system, to obtain an adjustment state of the model conversation understanding system;

an executing unit configured to use the model conversation understanding system to execute the conversation service based on the adjustment state of the model conversation understanding system.

The above aspect and any possible implementation mode further provide an implementation mode: the user feedback information comprises at least one of the following information:

positive information;
negative information;
error-correcting information;
clarifying information; and
defining information.

The above aspect and any possible implementation mode further provide an implementation mode: the user feedback information comprises active feedback information and passive feedback information.

The above aspect and any possible implementation mode further provide an implementation mode:

the obtaining unit is configured to obtain training feedback information provided by conversation service conducted by a user and a basic conversation understanding system;

the adjusting unit is configured to, according to the training feedback information, perform adjustment processing for a service state of the basic conversation understanding system, to obtain an adjustment state of the basic conversation understanding system;

the apparatus further comprises a building unit configured to perform data merging processing according to the training feedback information and the adjustment state of the basic conversation understanding system, to obtain model training data for building the model conversation understanding system.

The above aspect and any possible implementation mode further provide an implementation mode: the building unit is further configured to:

obtain application scenario information of a conversation service scenario provided by a developer, the application scenario information including intent information, parameter information and corresponding execution actions; and according to the application scenario information, build the basic conversation understanding system having basic service logic.

The above aspect and any possible implementation mode further provide an implementation mode: the apparatus further comprises an evaluating unit configured to:

obtain evaluation data of the basic conversation understanding system according to the training feedback information; and obtain a satisfaction degree index of the basic conversation understanding system according to the evaluation data.

The above aspect and any possible implementation mode further provide an implementation mode: the building unit is further configured to:

perform data merging processing according to the user feedback information and the adjustment state of the model conversation understanding system, to obtain updated training data for updating the model conversation understanding system.

According to a further aspect of the present disclosure, there is provided a device, wherein the device comprises:
one or more processors;
a memory for storing one or more programs,
the one or more programs, when executed by said one or more processors, enable said one or more processors to implement the conversation processing method based on artificial intelligence according to one of the above aspects.

According to another aspect of the present disclosure, there is provided a computer readable storage medium on which a computer program is stored, wherein the program, when executed by a processor, implements the conversation processing method based on artificial intelligence according to one of the above aspects.

As known from the above technical solutions, in embodiments of the present disclosure, it is feasible to obtain the user feedback information provided by conversation service conducted by the user and the model conversation understanding system, then according to the user feedback information, perform adjustment processing for a service state of the model conversation understanding system, to obtain an adjustment state of the model conversation understanding system so that it is possible to execute the conversation service with the model conversation understanding system, based on the adjustment state of the model conversation understanding system. Since a fault-tolerant and fault-correcting mechanism is provided, it is possible to adjust the understanding capability of the model conversation understanding system in real time and thereby effectively improve the reliability of conversation by collecting the user's user feedback information, and then adjusting the service state of the model conversation understanding system in time based on the user feedback information.

In addition, with the technical solution provided by the present disclosure being employed, it is feasible to obtain the training feedback information provided by conversation service conducted by the user and the basic conversation understanding system, then according to the training feedback information, perform adjustment processing for a service state of the basic conversation understanding system, to obtain an adjustment state of the basic conversation understanding system so that it is possible to perform data merging processing according to the training feedback information and the adjustment state of the basic conversation understanding system, to obtain model training data for building the model conversation understanding system. This method does not require persons to participate in annotation operations of the training data, exhibits simple operations and a high correctness rate, and thereby improves the efficiency and reliability in building the conversation understanding system.

In addition, with the technical solution provided by the present disclosure being employed, partial operation of collecting the user-provided feedback information and generating the model training data is separated, encapsulated as a function, and provided to developers through a customizing platform. This partial operation is needed by respective conversation service scenarios, and is irrelevant to specific service logic of these conversation service scenarios, and can effectively reduce each developer's overhead in achieving this partial function.

In addition, the technical solution provided by the present disclosure may be employed to effectively improve the user's experience.

BRIEF DESCRIPTION OF DRAWINGS

To describe technical solutions of embodiments of the present disclosure more clearly, figures to be used in the embodiments or in depictions regarding the prior art will be described briefly. Obviously, the figures described below are only some embodiments of the present disclosure. Those having ordinary skill in the art appreciate that other figures may be obtained from these figures without making inventive efforts.

DETAILED DESCRIPTION OF PREFERRED EMBODIMENTS

To make objectives, technical solutions and advantages of embodiments of the present disclosure clearer, technical solutions of embodiment of the present disclosure will be described clearly and completely with reference to figures in embodiments of the present disclosure. Obviously, embodiments described here are partial embodiments of the present disclosure, not all embodiments. All other embodiments obtained by those having ordinary skill in the art based on the embodiments of the present disclosure, without making any inventive efforts, fall within the protection scope of the present disclosure.

It needs to be appreciated that the terminals involved in the embodiments of the present disclosure comprise but are not limited to a mobile phone, a Personal Digital Assistant (PDA), a wireless handheld device, a tablet computer, a Personal Computer (PC), an MP3 player, an MP4 player, and a wearable device (e.g., a pair of smart glasses, a smart watch, or a smart bracelet).

In addition, the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Figure 1:
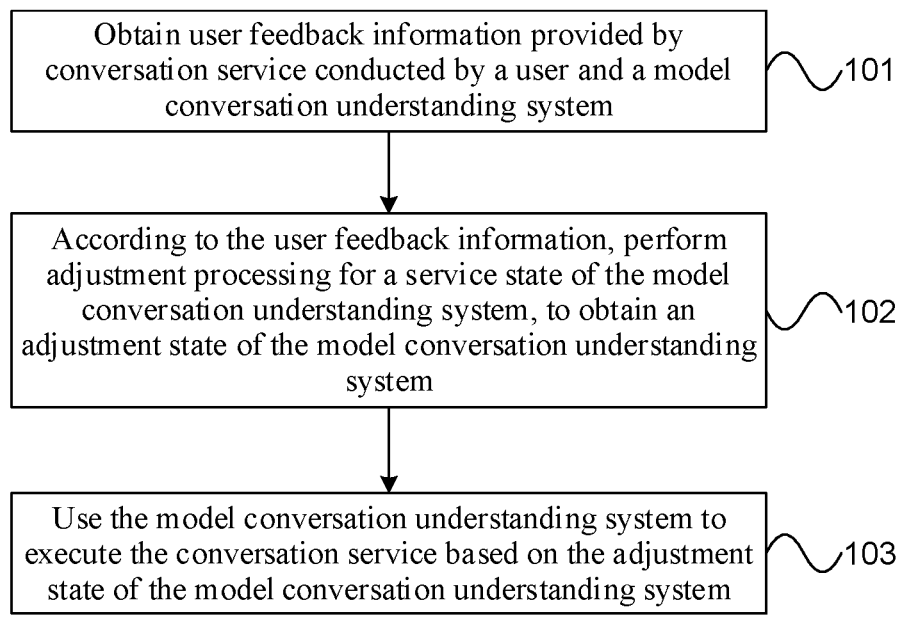
FIG. 1 is a flow chart of a conversation processing method based on artificial intelligence according to an embodiment of the present disclosure.

FIG. 1 is a flow chart of a conversation processing method based on artificial intelligence according to an embodiment of the present disclosure. As shown in FIG. 1, the method comprises the following steps:

101: obtaining user feedback information provided by conversation service conducted by a user and a model conversation understanding system.

102: according to the user feedback information, performing adjustment processing for a service state of the model conversation understanding system, to obtain an adjustment state of the model conversation understanding system.

103: executing the conversation service with the model conversation understanding system, based on the adjustment state of the model conversation understanding system.

It needs to be appreciated that subjects for executing 101-103 may partially or totally be an application located in a local terminal, or a function unit such as a plug-in or Software Development Kit (SDK) located in an application of the local terminal, or a processing engine located in a network-side server, or a distributed type system located on the network side. This is not particularly limited in the present embodiment.

It may be understood that the application may be a native application (nativeAPP) installed on the terminal, or a webpage program (webApp) of a browser on the terminal. This is not particularly limited in the present embodiment.

As such, it is feasible to obtain the user feedback information provided by the conversation service conducted by the user and the model conversation understanding system, then according to the user feedback information, perform adjustment processing for a service state of the model conversation understanding system, to obtain an adjustment state of the model conversation understanding system so that it is possible to execute the conversation service with the model conversation understanding system, based on the adjustment state of the model conversation understanding system. Since a fault-tolerant and fault-correcting mechanism is provided, it is possible to adjust the understanding capability of the model conversation understanding system in real time and thereby effectively improve the reliability of conversation by collecting the user's user feedback information, and then adjusting the service state of the model conversation understanding system in time based on the user feedback information.

While the user and the model conversation understanding system perform the conversation service, the generated user feedback information may include but not limited to at least one of the following information:

positive information;

negative information;

error-correcting information;

clarifying information; and defining information.

Specifically, the user feedback information comprises active feedback information and passive feedback information. This is not particularly limited in the present embodiment.

The so-called active feedback information refers to feedback content initiated by the user.

Specifically, the active feedback information may be correction of a speech recognition result, correction of an intent recognition result, correction or supplement of parameter types and parameter values, correction or supplement of an execution result, confirmation or negation of a speech recognition result, an intent recognition result, parameters and an execution result, and a combination of any of the above aspects, or may further be a certain newly-added intent, parameter, execution action and a triggering rule of the execution action, or may further be other supplemental data. This is not particularly limited in the present embodiment.

The so-called passive feedback information means that a query is initiated to the user, and the user responds.

Specifically, the query may comprise an open-type query and a selective query, may be a query for the speech recognition result, a query for the intent recognition result, a query for the parameter type or parameter value, a query for the execution result, and a combination of any of the above aspects, or may further be a query for missing data, or may further be a query for a synonymy problem. This is not particularly limited in the present embodiment.

Optionally, in a possible implementation mode of the present embodiment, before 101, the method may further comprise a building procedure of the model conversation understanding system.

Specifically, it is feasible to obtain training feedback information provided by conversation service conducted by the user and the basic conversation understanding system, and then perform adjustment processing for a service state of the basic conversation understanding system according to the training feedback information, to obtain an adjustment state of the basic conversation understanding system. Then, it is feasible to perform data merging processing according to the training feedback information and the adjustment state of the basic conversation understanding system, to obtain model training data for building the model conversation understanding system.

As such, it is feasible to obtain the training feedback information provided by conversation service conducted by the user and the basic conversation understanding system, then according to the training feedback information, perform adjustment processing for a service state of the basic conversation understanding system, to obtain an adjustment state of the basic conversation understanding system so that it is possible to perform data merging processing according to the training feedback information and the adjustment state of the basic conversation understanding system, to obtain the model training data for building the model conversation understanding system. This method does not require persons to participate in annotation operations of the training data, exhibits simple operations and a high correctness rate, and thereby improves the efficiency and reliability in building the conversation understanding system.

In the implementation mode, before the building, it is further feasible to obtain application scenario information of a conversation service scenario provided by a developer, the application scenario information including intent information, parameter information and corresponding execution actions, and then, according to the application scenario information, build the basic conversation understanding system having basic service logic.

In this implementation mode, the developer only needs to concern conversation logic, namely, intent and parameters related to a specific conversation service scenario, and then define the application scenario information of the conversation service scenario. The application scenario information comprises intent information, parameter information (slots) and corresponding execution actions.

Specifically, it is possible to provide a visualized customization page for the developer to provide the application scenario information of the conversation service scenario.

For example, the visualized customization page as provided may include input controls such as a definition box of the intent for example finding a car (intent; find_car), a definition box of parameters such as a car (car; red Camero), a car color (color; red) and a car model (model; Camero), a definition box of execution actions, and triggering rules of the execution actions, and may further comprise a definition box of response content, a definition box of response-triggering rules, and so on.

After the building of the basic conversation understanding system having the basic service logic is completed, the basic conversation understanding system may serve as an initial conversation understanding system and conducts conversation service with the user. At this time, the user may be understood as a human Trainer. During the conversation between the basic conversation understanding system, the technical solution according to the present disclosure may be employed to mine the model training data having training value.

It may be appreciated that both parties performing the conversation service are the basic conversation understanding system and the Trainer, and have a common task and target. A task of the basic conversation understanding system is to provide its service of the conversation service scenario, for example, query for weather, ticket booking or the like, whereas a target of the Trainer is to complete demands for service through the basic conversation understanding system, for example, query for weather, ticket booking or the like.

While the Trainer and the basic conversation understanding system perform the conversation service, the generated training feedback information may include but not limited to at least one of the following information:
positive information;
negative information;
error-correcting information;
clarifying information; and
defining information.

Specifically, the training feedback information comprises active feedback information and passive feedback information. This is not particularly limited in the present embodiment.

The so-called active feedback information refers to feedback content initiated by the Trainer.

Specifically, the active feedback information may be correction of a speech recognition result, correction of an intent recognition result, correction or supplement of parameter types and parameter values, correction or supplement of an execution result, confirmation or negation of a speech recognition result, an intent recognition result, parameters and an execution result, and a combination of any of the above aspects, or may further be a certain newly-added intent, parameter, execution action and a triggering rule of the execution action, or may further be other supplemental data. This is not particularly limited in the present embodiment.

The so-called passive feedback information means that a query is initiated to the Trainer, and the Trainer responds.

Specifically, the query may comprise an open-type query and a selective query, may be a query for the speech recognition result, a query for the intent recognition result, a query for the parameter type or parameter value, a query for the execution result, and a combination of any of the above aspects, or may further be a query for missing data, or may further be a query for a synonymy problem. This is not particularly limited in the present embodiment.

In this implementation mode, after obtaining the training feedback information provided by conversation service conducted by the user and the basic conversation understanding system, it is feasible to further obtain evaluation data of the basic conversation understanding system according to the training feedback information, and then obtain a satisfaction degree index of the basic conversation understanding system according to the evaluation data.

It may be appreciated that a similar method may be employed to obtain a satisfaction degree parameter of the model conversation understanding system based on the obtained user feedback information.

To make the method according to the embodiment of the present disclosure clearer, two types of training feedback information are taken as examples below. One type is active feedback information, and the other type is passive feedback information. An adjusting system may be employed to execute the method according to the present disclosure. The adjusting system may be specifically implemented by virtue of a robot, which is called an engineer robot here, and named Bernard. In the following examples, U represents a human Trainer; B represents a service robot, namely, the basic conversation understanding system; Bernard represents the engineer robot, namely, the adjusting system. The service robot and the engineer robot collaborate, can achieve a dual robot collaborative learning mechanism provided by the present disclosure, and may be briefly called a DUAL-BOT mechanism.

Examples of the first type of feedback information, namely, active feedback information are as follows:

a. Correction of a Speech Recognition Result
U: 情丝 (Qingsi) (input by voice)
B: I got it. What you said is 情丝 (Qingsi)
U: 丝 (si) should read 诗 (shi) (meaning poem) which have a 言 radical→(background) Bernard operates to replace "丝" in the input obtained by the service robot with "诗", and executes again (notes: re-command the service robot to execute the last instruction sent by the Trainer to the service robot, which is a standard action triggered by the Bernard upon completion of adjustment each time, and hereinafter referred to as "execute again".)
B: I got it. What you said is 情诗 (love poem).

b. Correction of an Intent Recognition Result
U: help me download Andy Lau's movies
B: ok, help you to search for Andy Lau's movies [Intent: search for movies, Slots: [actor: Andy Lau]]
U: no. I want to download movies→ (background) Bernard operates to replace the intent with downloading movies, and executes again.)
B: ok. Help you to download Andy Lau's movies [Intent: download movies, Slots: [actor: Andy Lau]]

c. Correction or Supplement of Parameter Types and Parameter Values
U: Help me search for a restaurant nearby Xi'erqi
B: I got it. Help you search for a restaurant nearby "erqi" [Intent: search for a restaurant, Slots:[Location:erqi]]
U: The location is Xi'erqi→ (background) Bernard operates to replace erqi with Xi'erqi, and re-execute
B: I got it. Help you search for a restaurant nearby "Xi'erqi" [Intent: search for a restaurant, Slots: [Location:Xi'erqi]]

d. Correction or Supplement of an Execution Result
U: Help me search for a restaurant nearby Xi'erqi
B: I got it. I got Quanjude roasted duck (Qianmen branch) [Intent: search for a restaurant, Slots: [Location: Xi'erqi]]
U: This branch is not nearby Xi'erqi→ (background) Bernard operates to mark the wrong execution result, and re-execute
B: I got it. I found Quanjude roasted duck (Tsinghua branch) [Intent: search for a restaurant, Slots:[Location: Xi'erqi]]

e. Confirmation or negation of a speech recognition result, an intent recognition result, parameters and an execution result
U: A restaurant nearby Xi'erqi
B: OK. Help you search for a restaurant nearby "erqi" [Intent: search for a restaurant, Slots: [Location: erqi]]
U: The recognition is wrong→ (background) Bernard operates to mark this response of the service robot as an error.

f. A Combination of any of the Above Aspects
U: A restaurant nearby Xi'erqi
B: OK. Help you search for a restaurant nearby "erqi" [Intent: search for a restaurant, Slots: [Location: erqi]]
U: The recognition is wrong, and the location is Xi'erqi→ (background) Bernard operates to mark this response of the service robot as an error, and operates to replace erqi with Xi'erqi, and finally re-executes g. A Certain Newly-Added Intent, Parameter, Execution Action and a Triggering Rule of the Execution Action
U: Rent a car to Baidu Plaza
B: Sorry, I do know how to answer you
U: newly add an intent→ (background) Bernard activates logic of the newly-added intent and begins to ask the Trainer in reply
Bernard: What is the Chinese wording for the intent?
U: 打车 (rent a car)
Bernard: What is the English keyword of the intent?
U: RENT_CAR→ Bernard pursues for asking a necessary slot of intent and a satisfaction-type action finally triggered by the intent
Bernard: creation of the intent is completed. The intent of renting a car to Baidu Plaza is RENT_CAR, and the slot includes XXX h. Other Supplemental Data
U: nearby Zhaohang (China Merchants Bank)
B: I cannot catch you
U: Zhaohang means China Merchants Bank→ (background) Bernard adds the information that Zhaohang is a synonym of China Merchants Bank into a slot dictionary, replaces the question with "nearby China Merchants Bank", and finally re-executes
B: I found three nearby China Merchants Banks [Intent: search for a location, Slots:[Poi: China Merchants Bank]]

The second type: examples of passive feedback information are as follows a. A Query for the Speech Recognition Result
U: 情丝 (Qingsi)
Bernard: do you mean 情诗 (Love Poem)?
U: yes→ (background) Bernard operate to replace 丝 in input obtained by the service robot with "诗 (poem)", and re-executes
B: I got it. What you said is 情诗 (love poem).

b. A Query for the Intent Recognition Result
U: I want Andy Lau's movies
Bernard: Do you want to search for movies or download movies?
U: I want to download movies→ (background) Bernard clarifies the intent as download, and re-executes
B: ok, help you download Andy Lau's movies [Intent: download movies, Slots:[actor: Andy Lau]]

c. A Query for the Parameter Type or Parameter Value
U: Help me search for Xi'erqi restaurants
Bernard: is Xi'erqi the location?
U: yes→ (background) Bernard clarifies the type of Xi'erqi as location, and re-executes
B: I got it. Help you search for a restaurant nearby "Xi'erqi" [Intent: search for a restaurant, Slots:[Location:Xi'erqi]]

d. A Query for the Execution Result
U: nearby Hai Di Lao Hot pot
Bernard: found Hai Di Lao Hot pot Shangdi branch and Hai Di Lao Hot pot Xi'erqi Branch. Which one do you select?
U: the second→ (background) Bernard trims the execution result to have only one left
B: found Hai Di Lao Hot pot Xi'erqi Branch e. A Query for Missing Data U: Help me to search for Zhaohang
Bernard: What is Zhaohang?
U: Zhaohang means China Merchants Bank→ (background) Bernard adds the information that Zhaohang is a synonym of China Merchants Bank into a slot dictionary, replaces the question with "help me search for nearby China Merchants Bank", and finally re-executes
B: I found three nearby China Merchants Banks [Intent: search for a location, Slots:[Poi: China Merchants Bank]]
f. A Query for a Synonymy Problem
U: Help me open a credit card
Bernard: I cannot completely catch you. Do you want to open a credit card?
U: yes→ (background) Bernard records "help me open a credit card"="want to open a credit card", replaces the question with "want to open a credit card", and re-executes
B: ok, begin to help you open a credit card [Intent: open a credit card]

In response to the operations of the above two types of training feedback information, Bernard may execute the technical solution, namely, 101-103 provided by the present disclosure in turn. Specifically, after obtaining training feedback information provided by conversation service conducted by the user and the basic conversation understanding system, Bernard may, according to the training feedback information provided by the Trainer, perform adjustment processing for a service state of the basic conversation understanding system, to obtain an adjustment state of the basic conversation understanding system, and use the conversation understanding system to re-execute the conversation service based on the adjustment state after the adjustment. After obtaining the adjustment state of the basic conversation understanding system, Bernard may perform merging processing for the user's training feedback information and the adjustment state of the basic conversation understanding system, to obtain a correct annotation data as the model training data. Furthermore, Bernard may further store the obtained model training data in a feedback annotation area, so that these model training data may be used according to needs to re-optimize the basic conversation understanding system.

Furthermore, Bernard may further record Bernard's one response to the above two types of training feedback information as an instance of the basic conversation understanding system, accumulate multiple rounds of conversation, and then make statistics of times of Bernard intervening the basic conversation understanding system, thereby obtaining the satisfaction degree index of the basic conversation understanding system for the conversation service.

It may be appreciated that the role of the Trainer needed here may be a professional "robot trainer" employed by the developer, or a "terminal user" that the developer's product is finally faced with. The two types of Trainer roles are finally combined through an effect optimization process of a DUAL-BOT mechanism and a whole Trainer mechanism, and finally achieve a purpose of constantly optimizing the conversation understanding system, namely, the basic conversation understanding system or the model conversation understanding system.

The process of using the feedback training data to optimize the basic conversation understanding system may be understood as a building process of the model conversation understanding system. Upon completion of the building of the model conversation understanding system, a process of optimizing the model conversation understanding system with the user training data may be used to perform the optimization operation of the model conversation understanding system.

The user feedback information and the training feedback information here may both be regarded as feedback content provided by the role of the Trainer. The difference only lies in time of providing. The time of providing the user feedback information is during use of an ordinary user who is online after the model conversation understanding system gets online. The time of providing the training feedback information is during use of a specific user who is offline before the model conversation understanding system gets online.

Optionally, in a possible implementation mode of the present embodiment, after 103, it is further feasible to use the built model conversation understanding system to perform the conversation service.

Specifically, it is feasible to obtain the user feedback information provided by conversation service conducted by the user and the model conversation understanding system, and then perform adjustment processing for a service state of the model conversation understanding system according to the user feedback information, to obtain an adjustment state of the model conversation understanding system. Then, it is feasible to use the model conversation understanding system to execute the conversation service based on the adjustment state of the model conversation understanding system.

As such, the present disclosure provides a fault-tolerant and fault-correcting mechanism. It is possible to adjust the understanding capability of the model conversation understanding system in real time and thereby effectively improve the reliability of conversation by collecting the user's user feedback information, and then adjusting the service state of the model conversation understanding system in time based on the user feedback information.

In this implementation mode, the optimization operation of the model conversation understanding system may be further performed by referring to the relevant content of the basic conversation understanding system. Specifically, it is specifically feasible to perform data merging processing according to the user feedback information and the adjustment state of the model conversation understanding system, to obtain updated training data for updating the model conversation understanding system.

The present disclosure provides a task-orientated conversation-type customization and learning mechanism of the conversation understanding system, which may be called a Trainer mechanism, and on this basis, defines a "dual robot collaborative learning mechanism", to ensure that the Trainer mechanism can be implemented smoothly. As compared with the building method of the current conversation understanding system, the building method proposed by the present disclosure has the following advantages:

A. training data collection: the conversation type customization and learning mechanism may be employed to effectively reduce the threshold of annotation of the training data, transform a working target of a human annotator from direct and stiff annotation into completing a given service scenario target together with a DUAL-BOT comprised of the service robot and the engineer robot, so that more people may participate in the contribution in building the training data needed by the conversation understanding system, and effectively improving the collection efficiency of the training data.

B. conversation fault-tolerant and adjustment mechanism: by designing the DUAL-BOT mechanism, the conversation understanding capability of feedback and fault tolerance is peeled and abstracted from normal logic of the service robot, and shall be borne by the engineer robot-Bernard so that the provider of the DUAL-BOT mechanism more focuses on the function of optimizing Bernard, thereby providing a more sound fault-tolerant and fault-correcting mechanism; meanwhile, the developer can concentrate on the improvement of the conversation understanding capability of the service robot itself and thereby achieve win-win.

C. Effective use of the user feedback information provided by the online user: the DUAL-BOT mechanism helps a customizing platform of the conversation understanding system and its developer to jointly provide the online users with a set of conversation robot with more perfect functions, namely, a complete system comprised of the service robot and the engineer robot. With Bernard collecting and refining the user feedback information of online users, it is feasible to covert real conversation between the online user and the conversation robot directly into real training data, and skip the background's manual secondary processing of the user data, thereby substantially reducing the conversation costs, implementing the model's direct learning of the online user's feedback, and finally more efficiently using the online user data.

The adjusting system provided by the present disclosure, also called the engineer robot Bernard, is a general-purpose system-level robot which is originally created by the present disclosure and dedicated to process the user's feedback information, it may execute the method provided by the present disclosure, and a lot of general-purpose understanding capabilities and processing solutions of the user's feedback information are built in the adjusting system. Partial operation of collecting the user-provided feedback information, namely, the training feedback information and the user feedback information, and generating/updating the model training data is separated, encapsulated as a function, and provided to developers through the customizing platform. This partial operation is needed by respective conversation service scenarios, and is irrelevant to specific service logic of these conversation service scenarios, and can effectively reduce each developer's overhead in achieving this partial function.

In the present embodiment, it is feasible to obtain the user feedback information provided by conversation service conducted by the user and the model conversation understanding system, then according to the user feedback information, perform adjustment processing for a service state of the model conversation understanding system, to obtain an adjustment state of the model conversation understanding system so that it is possible to execute the conversation service with the model conversation understanding system, based on the adjustment state of the model conversation understanding system. Since a fault-tolerant and fault-correcting mechanism is provided, it is possible to adjust the understanding capability of the model conversation understanding system in real time and thereby effectively improve the reliability of conversation by collecting the user's user feedback information, and then adjusting the service state of the model conversation understanding system in time based on the user feedback information.

In addition, with the technical solution provided by the present disclosure being employed, it is feasible to obtain the training feedback information provided by conversation service conducted by the user and the basic conversation understanding system, then according to the training feedback information, perform adjustment processing for a service state of the basic conversation understanding system, to obtain an adjustment state of the basic conversation understanding system so that it is possible to perform data merging processing according to the training feedback information and the adjustment state of the basic conversation understanding system, to obtain model training data for building the model conversation understanding system. This method does not require persons to participate in annotation operations of the training data, exhibits simple operations and a high correctness rate, and thereby improves the efficiency and reliability in building the conversation understanding system.

In addition, with the technical solution provided by the present disclosure being employed, partial operation of collecting the user-provided feedback information and generating the model training data is separated, encapsulated as a function, and provided to developers through the customizing platform. This partial operation is needed by respective conversation service scenarios, and is irrelevant to specific service logic of these conversation service scenarios, and can effectively reduce each developer's overhead in achieving this partial function.

In addition, the technical solution provided by the present disclosure may be employed to effectively improve the user's experience.

It needs to be appreciated that regarding the aforesaid method embodiments, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

Figure 2:
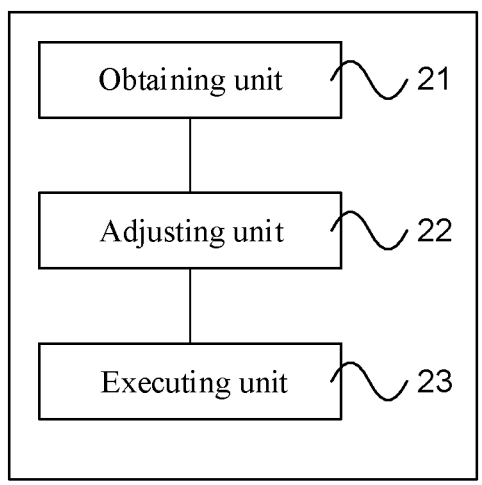
FIG. 2 is a structural schematic diagram of a conversation processing apparatus based on artificial intelligence according to another embodiment of the present disclosure.

FIG. 2 is a structural schematic diagram of a conversation processing apparatus based on artificial intelligence according to another embodiment of the present disclosure. As shown in FIG. 2, the conversation processing apparatus based on artificial intelligence according to the present embodiment may comprise an obtaining unit 21, an adjusting unit 22 and an executing unit 23, wherein the obtaining unit 21 is configured to obtain user feedback information provided by conversation service conducted by a user and a model conversation understanding system; the adjusting unit 22 is configured to, according to the user feedback information, perform adjustment processing for a service state of the model conversation understanding system, to obtain an adjustment state of the model conversation understanding system; the executing unit 23 is configured to execute the conversation service with the model conversation understanding system, based on the adjustment state of the model conversation understanding system.

It needs to be appreciated that the conversation processing apparatus based on artificial intelligence according to the present embodiment may partially or totally be an application located in a local terminal, or a function unit such as a plug-in or Software Development Kit (SDK) located in an application of the local terminal, or a processing engine located in a network-side server, or a distributed type system located on the network side. This is not particularly limited in the present embodiment.

It may be understood that the application may be a native application (nativeAPP) installed on the terminal, or a webpage program (webApp) of a browser on the terminal. This is not particularly limited in the present embodiment.

Optionally, in a possible implementation mode of the present embodiment, the user feedback information may include but not limited to at least one of the following information:

positive information;
negative information;
error-correcting information;
clarifying information; and
defining information.

Specifically, the user feedback information comprises active feedback information and passive feedback information. This is not particularly limited in the present embodiment.

The so-called active feedback information refers to feedback content initiated by the user.

Specifically, the active feedback information may be correction of a speech recognition result, correction of an intent recognition result, correction or supplement of parameter types and parameter values, correction or supplement of an execution result, confirmation or negation of a speech recognition result, an intent recognition result, parameters and an execution result, and a combination of any of the above aspects, or may further be a certain newly-added intent, parameter, execution action and a triggering rule of the execution action, or may further be other supplemental data. This is not particularly limited in the present embodiment.

The so-called passive feedback information means that a query is initiated to the user, and the user responds.

Specifically, the query may comprise an open-type query and a selective query, may be a query for the speech recognition result, a query for the intent recognition result, a query for the parameter type or parameter value, a query for the execution result, and a combination of any of the above aspects, or may further be a query for missing data, or may further be a query for a synonymy problem. This is not particularly limited in the present embodiment.

Figure 3:
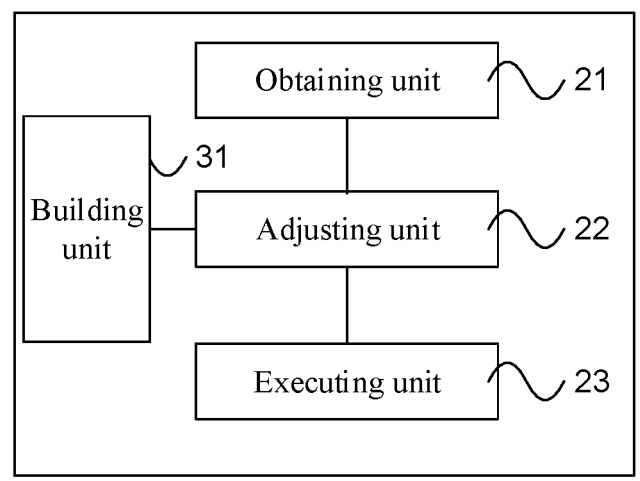
FIG. 3 is a structural schematic diagram of a conversation processing apparatus based on artificial intelligence according to a further embodiment of the present disclosure.

Optionally, in a possible implementation mode of the present embodiment, as shown in FIG. 3, the conversation processing apparatus based on artificial intelligence according to the present embodiment may further comprise a building unit 31.

The obtaining unit 21 may further be configured to obtain training feedback information provided by conversation service conducted by a user and a basic conversation understanding system;

the adjusting unit 22 may further be configured to, according to the training feedback information, perform adjustment processing for a service state of the basic conversation understanding system, to obtain an adjustment state of the basic conversation understanding system;

the building unit 31 may further be configured to perform data merging processing according to the training feedback information and the adjustment state of the basic conversation understanding system, to obtain model training data for building a model conversation understanding system.

In this implementation mode, the building unit 31 may be further configured to obtain application scenario information of a conversation service scenario provided by a developer, the application scenario information including intent information, parameter information and corresponding execution actions, and then, according to the application scenario information, build the basic conversation understanding system having basic service logic.

Figure 4:
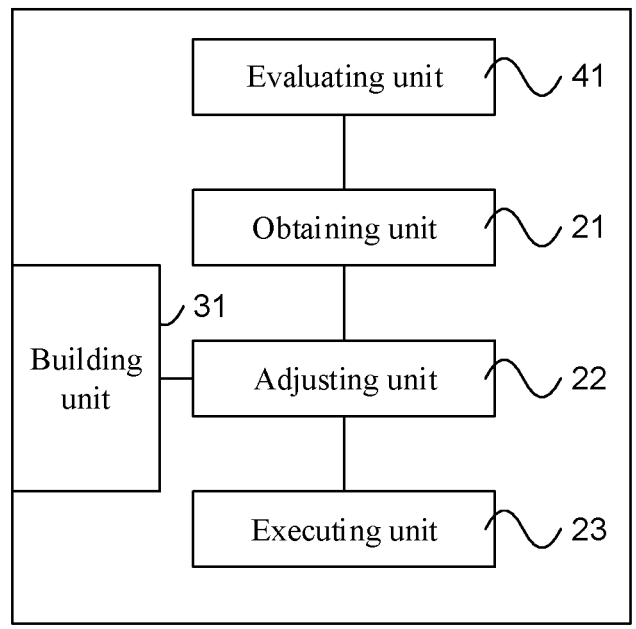
FIG. 4 is a structural schematic diagram of a conversation processing apparatus based on artificial intelligence according to a further embodiment of the present disclosure.

In this implementation mode, as shown in FIG. 4, the conversation processing apparatus based on artificial intelligence according to the present embodiment may further comprise an evaluating unit 41 which may be configured to obtain evaluation data of the basic conversation understanding system according to the training feedback information, and obtain a satisfaction degree index of the basic conversation understanding system according to the evaluation data.

Optionally, in a possible implementation mode of the present embodiment, the building unit 31 may further be configured to perform data merging processing according to the user feedback information and the adjustment state of the model conversation understanding system, to obtain updated training data for updating the model conversation understanding system.

It needs to be appreciated that the method in the embodiment corresponding to FIG. 1 may be implemented by the conversation processing apparatus based on artificial intelligence according to the present embodiment. Detailed description will not be detailed any longer here, and reference may be made to relevant content in the embodiment corresponding to FIG. 1.

In the present embodiment, it is feasible to obtain, by the obtaining unit, the training feedback information provided by conversation service conducted by the user and the basic conversation understanding system, then according to the training feedback information, perform, by the adjusting unit, adjustment processing for a service state of the basic conversation understanding system, to obtain an adjustment state of the basic conversation understanding system so that it is possible for the building unit to perform data merging processing according to the training feedback information and the adjustment state of the basic conversation understanding system, to obtain model training data for building the model conversation understanding system. This method does not require persons to participate in annotation operations of the training data, exhibits simple operations and a high correctness rate, and thereby improves the efficiency and reliability in building the conversation understanding system.

In addition, with the technical solution provided by the present disclosure being employed, partial operation of collecting the user-provided feedback information and generating the model training data is separated, encapsulated as a function, and provided to developers through the customizing platform. This partial operation is needed by respective conversation service scenarios, and is irrelevant to specific service logic of these conversation service scenarios, and can effectively reduce each developer's overhead in achieving this partial function.

In addition, the technical solution provided by the present disclosure may be employed to effectively improve the user's experience.

Figure 5:
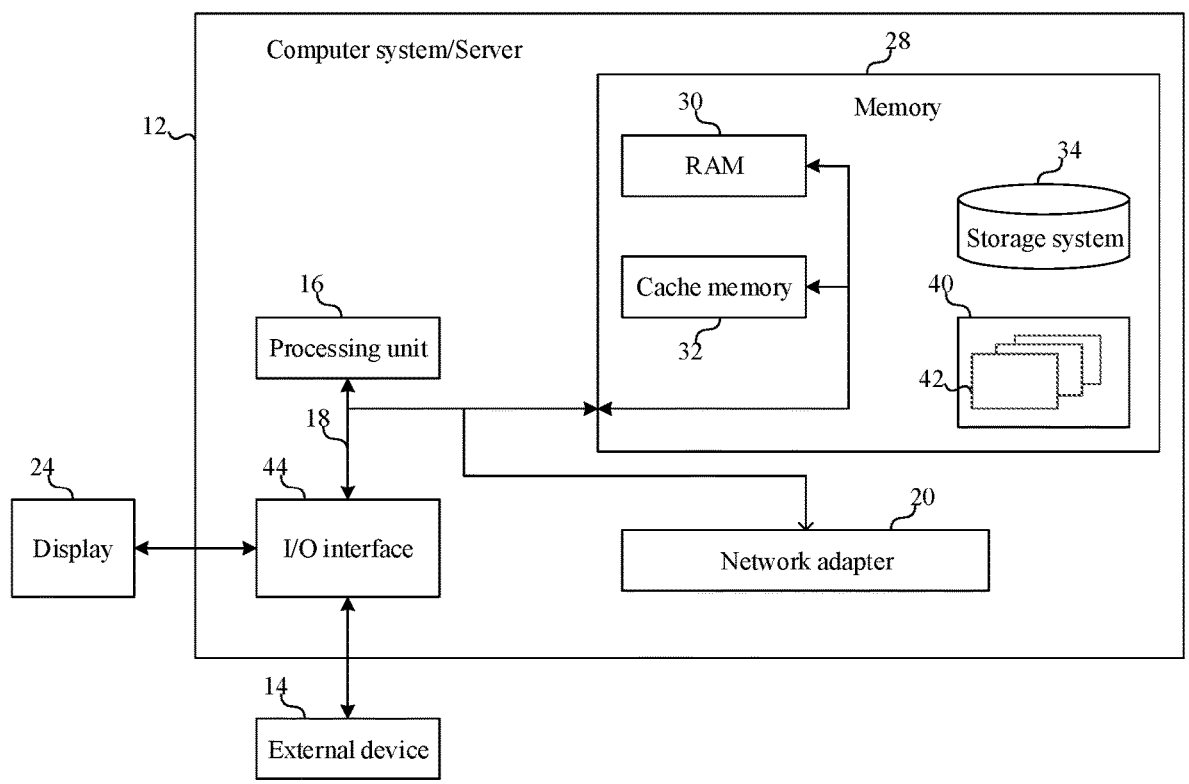
FIG. 5 is a block diagram of an example computer system/server 12 adapted to implement an embodiment of the present disclosure.

FIG. 5 is a block diagram of an exemplary computer system/server 12 adapted to implement the embodiment of the present disclosure. The computer system/server 12 shown in FIG. 5 is only an example and should not bring about any limitation to the function and range of use of the embodiments of the present disclosure.

As shown in FIG. 5, the computer system/server 12 is shown in the form of a general-purpose computing device. The components of computer system/server 12 may include, but are not limited to, one or more processors or processing units 16, a storage device or system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. The memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 44. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The processing unit 16 executes various function applications and data processing by running programs stored in the system memory 28, for example, implement the conversation processing method based on artificial intelligence according to the embodiment corresponding to FIG. 1.

Another embodiment of the present disclosure further provides a computer-readable storage medium on which a computer program is stored. The program, when executed by a processor, implements the conversation processing method based on artificial intelligence according to the embodiment corresponding to FIG. 1.

Specifically, any combinations of one or more computer-readable media may be employed. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be a tangible device that can retain and store instructions for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those skilled in the art can clearly understand that for purpose of convenience and brevity of depictions, reference may be made to corresponding procedures in the aforesaid method embodiments for specific operation procedures of the system, apparatus and units described above, which will not be detailed any more.

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

Finally, it is appreciated that the above embodiments are only used to illustrate the technical solutions of the present disclosure, not to limit the present disclosure; although the present disclosure is described in detail with reference to the above embodiments, those having ordinary skill in the art should understand that they still can modify technical solutions recited in the aforesaid embodiments or equivalently replace partial technical features therein; these modifications or substitutions do not cause essence of corresponding technical solutions to depart from the spirit and scope of technical solutions of embodiments of the present disclosure.

What is claimed is:

1. A conversation processing method based on artificial intelligence, wherein the method comprises:
   obtaining user feedback information provided by conversation service conducted by a user and a model conversation understanding system;
   according to the user feedback information, performing adjustment processing for a service state of the model conversation understanding system, to obtain an adjustment state of the model conversation understanding system; and
   using the model conversation understanding system to execute the conversation service based on the adjustment state of the model conversation understanding system,
   wherein the user feedback information comprises active feedback information and passive feedback information, the active feedback information comprising a newly-added intent, parameter, execution action and a triggering rule of the execution action; and
   wherein before obtaining user feedback information provided by conversation service conducted by a user and a model conversation understanding system, the method further comprises:
      obtaining training feedback information provided by conversation service conducted by a user and a basic conversation understanding system;
      according to the training feedback information, performing adjustment processing for a service state of the basic conversation understanding system, to obtain an adjustment state of the basic conversation understanding system; and
      performing data merging processing according to the training feedback information and the adjustment state of the basic conversation understanding system, to obtain model training data for building the model conversation understanding system,
   wherein the adjustment processing for a service state of the basic conversation understanding system comprises:
      for the active feedback information, correction of a speech recognition result; correction of an intent recognition result; correction or supplement of parameter types and parameter values; correction or supplement of an execution result; confirmation or negation of a speech recognition result; an intent recognition result, parameters and an execution result; and a certain newly-added intent, parameter, execution action and a triggering rule of the execution action; and for the passive feedback information, a query for the speech recognition result; a query for the intent recognition result; a query for the parameter type or parameter value; a query for the execution result; and a query for missing data.

2. The method according to claim 1, wherein the user feedback information comprises at least one of the following information:
   positive information;
   negative information;
   error-correcting information;
   clarifying information; and
   defining information.

3. The method according to claim 1, wherein before obtaining training feedback information provided by conversation service conducted by a user and a basic conversation understanding system, the method further comprises:
   obtaining application scenario information of a conversation service scenario provided by a developer, the application scenario information including intent information, parameter information and corresponding execution actions;
   according to the application scenario information, building the basic conversation understanding system having basic service logic.

4. The method according to claim 1, wherein after obtaining training feedback information provided by conversation service conducted by a user and a basic conversation understanding system, the method further comprises:

obtaining evaluation data of the basic conversation understanding system according to the training feedback information;

obtaining a satisfaction degree index of the basic conversation understanding system according to the evaluation data.

5. The method according to claim 1, wherein after the step of, according to the user feedback information, performing adjustment processing for a service state of the model conversation understanding system, to obtain an adjustment state of the model conversation understanding system, the method further comprises:

performing data merging processing according to the user feedback information and the adjustment state of the model conversation understanding system, to obtain updated training data for updating the model conversation understanding system.

6. A device, wherein the device comprises:
one or more processors;
a memory for storing one or more programs,
the one or more programs, when executed by said one or more processors, enable said one or more processors to implement a conversation processing method based on artificial intelligence, wherein the method comprises:
obtaining user feedback information provided by conversation service conducted by a user and a model conversation understanding system;
according to the user feedback information, performing adjustment processing for a service state of the model conversation understanding system, to obtain an adjustment state of the model conversation understanding system; and
using the model conversation understanding system to execute the conversation service based on the adjustment state of the model conversation understanding system,
wherein the user feedback information comprises active feedback information and passive feedback information, the active feedback information comprising a newly-added intent, parameter, execution action and a triggering rule of the execution action; and
wherein before obtaining user feedback information provided by conversation service conducted by a user and a model conversation understanding system, the method further comprises:
obtaining training feedback information provided by conversation service conducted by a user and a basic conversation understanding system;
according to the training feedback information, performing adjustment processing for a service state of the basic conversation understanding system, to obtain an adjustment state of the basic conversation understanding system; and
performing data merging processing according to the training feedback information and the adjustment state of the basic conversation understanding system, to obtain model training data for building the model conversation understanding system, wherein the adjustment processing for a service state of the basic conversation understanding system comprises.
for the active feedback information, correction of a speech recognition result; correction of an intent recognition result; correction or supplement of parameter types and parameter values; correction or supplement of an execution result; confirmation or negation of a speech recognition result; an intent recognition result, parameters and an execution result; and a certain newly-added intent, parameter, execution action and a triggering rule of the execution action; and for the passive feedback information, a query for the speech recognition result; a query for the intent recognition result; a query for the parameter type or parameter value; a query for the execution result; and a query for missing data.

7. The device according to claim 6, wherein the user feedback information comprises at least one of the following information:
positive information;
negative information;
error-correcting information;
clarifying information; and
defining information.

8. The device according to claim 6, wherein before obtaining training feedback information provided by conversation service conducted by a user and a basic conversation understanding system, the method further comprises:
obtaining application scenario information of a conversation service scenario provided by a developer, the application scenario information including intent information, parameter information and corresponding execution actions;
according to the application scenario information, building the basic conversation understanding system having basic service logic.

9. The device according to claim 6, wherein after obtaining training feedback information provided by conversation service conducted by a user and a basic conversation understanding system, the method further comprises:
obtaining evaluation data of the basic conversation understanding system according to the training feedback information;
obtaining a satisfaction degree index of the basic conversation understanding system according to the evaluation data.

10. The device according to claim 6, wherein after the step of, according to the user feedback information, performing adjustment processing for a service state of the model conversation understanding system, to obtain an adjustment state of the model conversation understanding system, the method further comprises:
performing data merging processing according to the user feedback information and the adjustment state of the model conversation understanding system, to obtain updated training data for updating the model conversation understanding system.

11. A non-transitory computer readable storage medium on which a computer program is stored, wherein the program, when executed by a processor, implements a conversation processing method based on artificial intelligence, wherein the method comprises:
obtaining user feedback information provided by conversation service conducted by a user and a model conversation understanding system;
according to the user feedback information, performing adjustment processing for a service state of the model conversation understanding system, to obtain an adjustment state of the model conversation understanding system; and
using the model conversation understanding system to execute the conversation service based on the adjustment state of the model conversation understanding system,
wherein the user feedback information comprises active feedback information and passive feedback information, the active feedback information comprising a newly-added intent, parameter, execution action and a triggering rule of the execution action; and wherein before obtaining user feedback information provided by conversation service conducted by a user and a model conversation understanding system, the method further comprises:

obtaining training feedback information provided by conversation service conducted by a user and a basic conversation understanding system;

according to the training feedback information, performing adjustment processing for a service state of the basic conversation understanding system, to obtain an adjustment state of the basic conversation understanding system; and performing data merging processing according to the training feedback information and the adjustment state of the basic conversation understanding system, to obtain model training data for building the model conversation understanding system, wherein the adjustment processing for a service state of the basic conversation understanding system comprises:

for the active feedback information, correction of a speech recognition result; correction of an intent recognition result; correction or supplement of parameter types and parameter values; correction or supplement of an execution result; confirmation or negation of a speech recognition result; an intent recognition result, parameters and an execution result; and a certain newly-added intent, parameter, execution action and a triggering rule of the execution action; and for the passive feedback information, a query for the speech recognition result; a query for the intent recognition result; a query for the parameter type or parameter value; a query for the execution result; and a query for missing data.

12. The non-transitory computer readable storage medium according to claim 11, wherein the user feedback information comprises at least one of the following information:
positive information;
negative information;
error-correcting information;
clarifying information; and
defining information.

13. The non-transitory computer readable storage medium according to claim 11, wherein before obtaining training feedback information provided by conversation service conducted by a user and a basic conversation understanding system, the method further comprises:

obtaining application scenario information of a conversation service scenario provided by a developer, the application scenario information including intent information, parameter information and corresponding execution actions;

according to the application scenario information, building the basic conversation understanding system having basic service logic.

14. The non-transitory computer readable storage medium according to claim 11, wherein after obtaining training feedback information provided by conversation service conducted by a user and a basic conversation understanding system, the method further comprises:

obtaining evaluation data of the basic conversation understanding system according to the training feedback information;

obtaining a satisfaction degree index of the basic conversation understanding system according to the evaluation data.

15. The non-transitory computer readable storage medium according to claim 11, wherein after the step of, according to the user feedback information, performing adjustment processing for a service state of the model conversation understanding system, to obtain an adjustment state of the model conversation understanding system, the method further comprises:

performing data merging processing according to the user feedback information and the adjustment state of the model conversation understanding system, to obtain updated training data for updating the model conversation understanding system.

* * * * *